United States Patent [19]

Bellisio

[11] Patent Number: 4,719,624
[45] Date of Patent: Jan. 12, 1988

[54] MULTILEVEL MULTIPLEXING

[75] Inventor: Jules A. Bellisio, Wall Township, Monmouth County, N.J.

[73] Assignee: Bell Communications Research, Inc., Livingston, N.J.

[21] Appl. No.: 864,037

[22] Filed: May 16, 1986

[51] Int. Cl.[4] .............................. H04J 3/12; H04J 3/04
[52] U.S. Cl. ................................. 370/100; 370/110.1; 370/112
[58] Field of Search ...................... 370/100, 110.1, 112, 370/106; 375/2.1

[56]  References Cited

U.S. PATENT DOCUMENTS

| | | | |
|---|---|---|---|
| 3,707,604 | 12/1972 | Greefkes et al. | 370/112 |
| 3,794,768 | 2/1974 | Cichetti, Jr. et al. | 370/112 |
| 3,995,119 | 11/1976 | Packynski, Jr. | 179/15 |
| 3,995,120 | 11/1976 | Pachynski, Jr. | 179/15 |

OTHER PUBLICATIONS

"Synchronous Optical Network (SONET)," Bell Communications Research Technical Advisory, TA-TSY-000253, Apr. 1985.
"Synchronous Optical Network (SONET)," Globecom, R. J. Boehm, Y. C. Ching, R. C. Sherman, 1985, pp. 1443-1450.

Primary Examiner—Douglas W. Olms
Assistant Examiner—Wellington Chin
Attorney, Agent, or Firm—James W. Falk; Stephen M. Gurey

[57] ABSTRACT

A synchronous PCM digital transmission system including multilevel multiplexing wherein the higher order multiplexers interleave two or more tributary signals each of which comprises a multiplexed plurality of subtributaries. Multiplexer framing is achieved by means of an auxiliary frame pattern or byte, $F_T$, which is slidable within the subscriber-defined frames. Each multiplexer in the system re-frames or slides $F_T$ and its associated overhead so that the $F_T$ bytes at each multiplexer are synchronized. The $F_T$ bytes can be used to frame or synchronize scrambling and de-scrambling circuitry. This concept provides multiplexer framing and yields high-speed multiplexed signals which are all exact multiples of the system clock rate, using relatively simple circuitry compared to competitive designs.

12 Claims, 7 Drawing Figures

MULTILEVEL MULTIPLEXING

BACKGROUND OF THE INVENTION

This invention relates to a digital transmission system involving multilevel multiplexing of digital signals from different sources to form a single high-speed signal. Multilevel multiplexing involves the use of cascaded time division multiplexers in which the higher order multiplexers interleave the outputs of two or more lower level multiplexers to form a multiplexing hierarchy.

The prior art includes a digital transmission system known as the Synchronous Optical Network (SONET). This network comprises multiplexers that utilize interleaving techniques for combining low speed tributaries to produce a high-speed line signal. Further details of the SONET will be found in the following publications "Synchronous Optical Network (SONET)," Bell Communications Research Technical Advisory, TA-TSY-000253, April 1985; R. J. Boehm, Y. C. Ching, and R. C. Sherman, "Synchronous Optical Network (SONET)," Globecom 1985, pp. 1443–1450. Each tributary signal arrives at the multiplexer with a source or subscriber-imposed pattern of framing bits (or a byte) as well as overhead bits thereon. Since these systems are synchronous, each source or subscriber terminal has available the master system clock; thus tributary signals will be bit synchronous with the master system clock but will have random phasing of the aforementioned framing and overhead bytes, since these portions of the signal are subscriber-controlled.

Such randomly framed tributary signals can be combined in a single multiplexer without the addition of any multiplexer framing time slots or the use of any high-speed processing circuitry following the multiplexer. This design simplifies the circuitry and yields a high-speed line signal with a bit rate that is an exact multiple of the tributary bit rates and hence also of the master clock. Each multiplexer comprises a preprocessor in each tributary channel with the outputs of all preprocessors applied to a bit interleaver, the output of which is the high-speed signal. In the aforementioned SONET system the preprocessors simply locate the frame of each incoming tributary and rewrite some of the overhead bytes thereon so that each channel can be identified at the receiver. Each preprocessor does this independently of the frame alignment of its neighbors. Each tributary signal thus is unchanged in frame alignment by its preprocessor and hence the high-speed signal will comprise the multiplexed tributary signals with their original frame alignment which as stated is arbitrary or random. At the receiving ends of these prior art systems, the demultiplexer initially has a random phase with respect to the individual multiplexed channels. The demultiplexer frames on one of the channels and determines its identity by reading its overhead data. The phase of the demultiplexer can then be sequentially stepped until all channels are correctly aligned and demultiplexed.

Problems arise in extending this multiplexing concept to systems including higher orders of multiplexing. For example, each of the higher order tributaries arriving at a higher order multiplexer will comprise several randomly frame aligned subtributaries. Thus, in order to identify each subtributary and to read, modify or rewrite the overhead data therein, each higher order tributary must, in effect, be broken down into all of its subtributary components and then reassembled prior to application to the higher order multiplexer. Thus, each preprocessor of each higher order multiplexer would necessarily comprise the equivalent of a full blown demultiplexer and remultiplexer, in addition to its other circuitry.

Further, the extension of the multiplexing concepts to multilevel multiplexing systems results in an overly tight coupling between subscriber provided data and network operation that can cause problems. These problems include reframing activity throughout the system resulting from switching between subscriber terminals. Worse still, certain defective input signals can prevent proper starting of the network. Also, coordination and administration of scramblers needed to achieve good signal statistics becomes a problem with the simple cascading of prior art multiplexers of these types.

SUMMARY OF THE INVENTION

The present invention comprises the use of an auxiliary framing pattern or byte which is part of the signal format of each subscriber terminal and which auxiliary pattern can be moved or shifted relative to its data stream by all of the preprocessor circuitry in a multilevel multiplexed system. These shifting framing bytes achieve the effect of multiplexer framing and permit the processing of overhead data at all levels of the system without the cost in hardware of previously proposed systems.

In the multilevel, multiplexed digital transmission system of the present invention, each subscriber terminal generates two framing pattern sets or bytes, $F_S$ and $F_T$, both of which have the same repetition rate and each have distinctive bit patterns that are recognizable by all of the framing circuitry in the system. When each tributary signal is constructed by the customer or subscriber, there is a predefined phase relationship between $F_S$ and $F_T$, the transmitted data and the overhead bytes. The $F_S$ bit or byte is the conventional framing signal used in decoding at the ultimate destination of each tributary signal. The $F_T$ framing bytes are the aforementioned auxiliary framing pattern, which are slidable, together with the associated overhead data, within the frames defined by the $F_S$ bytes to any relative phase position without destroying the data, changing the bit rate, or requiring large buffers or delay lines. This pulse displacement or sliding of $F_T$ within the tributary frames can be achieved with small buffers of the order of two bytes length. Each preprocessor brings each tributary into local $F_T$ alignment. This sort of multiplexer frame alignment eliminates most of the aforementioned multiplexing problems of the types discussed above. These auxiliary framing patterns can be used at any stage of the system for reading, switching or modifying overhead data and facilitates the demultiplexing and decoding of high-level signals. Also, the pulse displacement synchronization concept facilitates the scrambling and descrambling of the signals at any point in the system. At any level in the hierarchy, data is scrambled by a predetermined pseudo random pattern or word that is frame synchronized with the sliding framing byte, $F_T$. Thus at each preprocessor where the framing structure is shifted in phase, the incoming or existing scrambling patterns are removed and new scrambling imposed, which is synchronized with the new location of $F_T$. Since scrambling patterns reside in lookup tables (or memories) at each preprocessor, scrambling can be done at either the high or low side of the interleaver. This concept results in a robust, unambiguous architecture in which multiplexer tributaries need not be resolved into subtributaries for processing.

Thus, in accordance with the invention, there is provided a multilevel multiplexed digital transmission system with a form of high-speed signal framing which involves a sliding auxiliary framing byte ($F_T$) and associated overhead, which can be shifted by the preprocessing circuitry of each of the multiplexers in the system relative to the randomly phased data and framing bytes ($F_S$) of each tributary, so that the auxiliary framing bytes ($F_T$) and associated overhead of each tributary signal are synchronized in time at the input of the interleaver at each system multiplexer.

Further, in accordance with an aspect of my invention, a transmission system comprises a hierarchy of cascaded multiplexers wherein higher order multiplexers multiplex a plurality of multiplexed tributary signals of the same signal level, and wherein the digital signals are each provided with two framing bytes $F_S$ and $F_T$ with associated overhead data, and wherein each multiplexer in said system comprises preprocessing circuitry for detecting and removing the $F_T$ bytes and associated overhead of all incoming tributaries and for inserting new $F_T$ bytes and reprocessed overhead data in each tributary signal in such a way that the said new $F_T$ bytes of all tributary signals at a given multiplexer are synchronized at the input of the interleaver thereof, whereby said $F_T$ bytes and associated overhead function as multiplexer framing signals that can be used to facilitate the decoding and demultiplexing of such high-speed signals at the receiving end of the system, and whereby each of said preprocessors may be provided with scrambling and descrambling circuitry that is framed by the sliding $F_T$ bytes so that all of the multiplexed signals of any level may be scrambled.

DETAILED DESCRIPTION OF PREFERRED EMBODIMENTS

Figure 1:
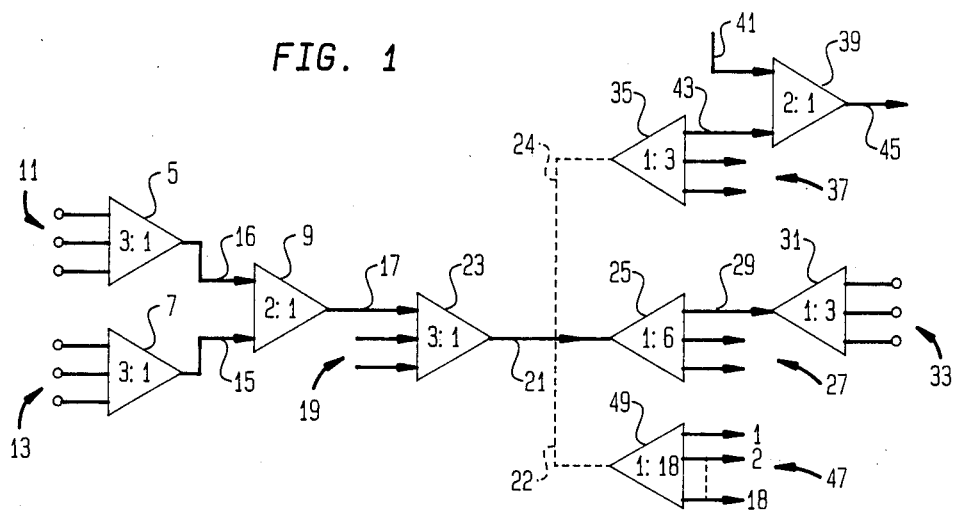
FIG. 1 illustrates various ways in which multilevel multiplexing systems may be arranged in the practice of the present invention.

FIG. 1 shows a pair of 3 to 1 multiplexers 5 and 7, each connected to three subscriber lines 11 and 13, respectively. Thus the outputs 15 and 16 of these multiplexers each comprise high-speed signals comprising interleaved bits alternately selected in a systematic fashion from each of the three input lines of each multiplexer. Such a high-speed signal is known as a level 3 signal, since it multiplexes three basic signals, each obtained from a subscriber terminal, not shown. The two multiplexers 5 and 7 are basic level multiplexers since their input tributary signals are unmultiplexed. The 2 to 1 multiplexer 9 that receives the multiplexed outputs of multiplexers 5 and 7 is a high-level multiplexer and its output 17 is a level 6 signal comprising six interleaved signals. The high-level multiplexer 23 has as inputs the level 6 signal from the output 17 of multiplexer 9, as well as two other level 6 inputs 19 from two other multiplexers (not shown). Thus the high-speed signal 21 at the output of multiplexer 23 will be a level 18 signal. It should be noted that all multiplexers in the system can only accept tributary signals of the same level, for example, all inputs of a given multiplexer must be either basic level signals from subscriber terminals, or all multiplexed signals of the same level.

The level 18 signal on high-speed line 21 may be applied to 1 to 6 demultiplexer 25 which can separate it into three level 3 signals. The level 3 signal on output 29 is then further demultiplexed to three basic level signals 33 at the output of 1 to 3 demultiplexer 31. The other two level 3 signals 27 at the output of demultiplexer 25 may be transmitted to another location, with or without further multiplexing.

The dashed line connection 22 illustrates an alternative arrangement or architecture wherein the level 18 signal is demultiplexed in a single 1 to 18 demultiplexer 49 that produces 18 outputs 47 which can be applied to an equal number of subscriber terminals (not shown).

Dashed line 24 shows another demultiplexer arrangement wherein the level 18 signal is applied to 1 to 3 demultiplexer 35 which yields three level 6 output signals. The output 43 thereof is multiplexed in multiplexer 39 with another level 6 signal on line 41 to form a level 12 output signal on line 45. The two level 6 signals on outputs 37 may be transmitted to different locations for demultiplexing and distribution to subscriber terminals. FIG. 1 shows that the invention can be used to construct a wide variety of multilevel architectures to suit a wide variety of applications.

All of the system multiplexers including the basic level and high-level multiplexers comprise the same circuitry, namely a preprocessor circuit for each incoming tributary line, followed by a bit interleaver. Since the multiplexer output circuit is a simple bit interleaver, there is no high-speed processing of the high-speed signal. Further, the high-speed line bit rates are all exact multiples of the bit rates of all tributary lines. These features simplify the system circuitry in that all processing may occur at the lowest possible data rate and all bit interleavers and de-interleavers can operate at exact multiples of the system clock, which is available at all points in the system.

Figure 2:
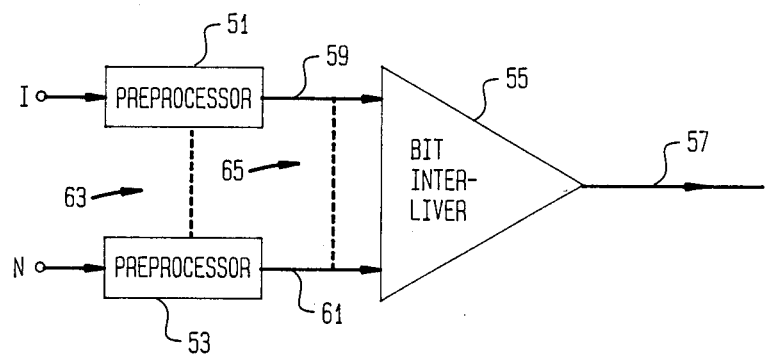
FIG. 2 is a block diagram of a typical multiplexer for use in a multilevel multiplexing system of the present invention.

As shown in FIG. 2, each multiplexer comprises a preprocessor in each input tributary line. The preprocessor 51 is shown with its input connected to tributary I and its output 59 to bit interleaver 55. Preprocessor 53 has its input connected to tributary N and its output 61 to the bit interleaver. Each of the N−2 intervening lines 63 will also include identical preprocessors with their outputs 65 all connected to bit interleaver 55. The bit interleaver periodically samples the outputs of all of the preprocessors to yield the high-speed, high-level signal on its output 57. Bit interleavers are well known in the art and may comprise, for example, one or more shift registers that are loaded in parallel with the outputs of all preprocessors and serially read out by a clock signal operating at the basic system clock rate multiplied by the level of the output signal on line 57.

Figure 3:
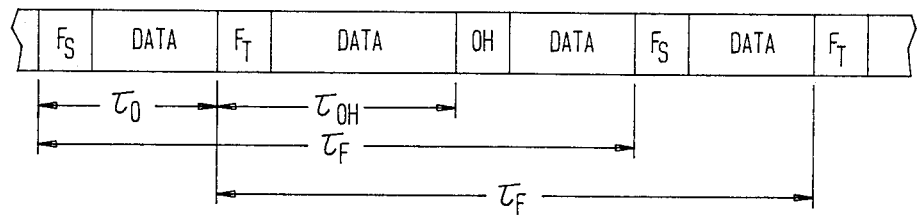
FIG. 3 shows the signal format generated by each subscriber terminal in the system.

FIG. 3 shows the digital signal format produced by each subscriber in the system. The data is framed by framing bytes $F_S$. The auxiliary or sliding framing bytes ($F_T$) are initially inserted anywhere in the frame defined by $F_S$. Both $F_S$ and $F_T$ have the same repetition period, $\tau_F$. FIG. 3, $F_S$ and $F_T$ are shown separated by a time period $\tau_O$. $F_T$ associated with it overhead data, labeled OH, and having a fixed separation therefrom, $\tau_{OH}$.

Figure 4:
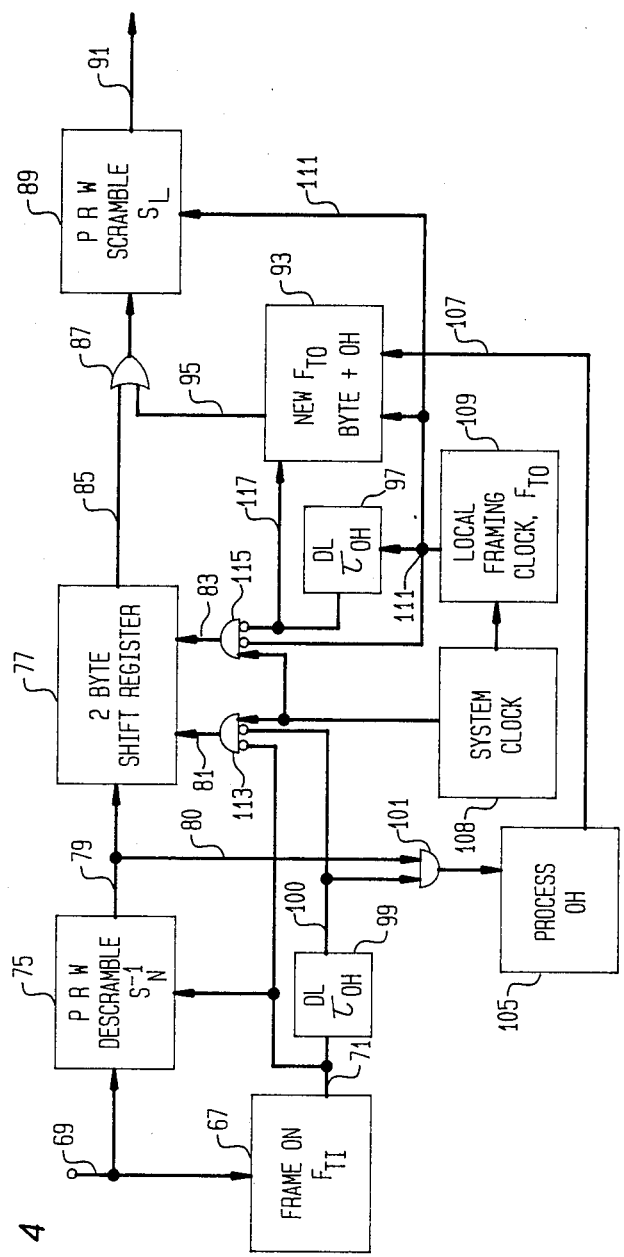
FIG. 4 is a block diagram of a preprocessor utilized at each multiplexer in the present system.

FIG. 4 is a simplified block diagram of each of the preprocessors in the system. The preprocessor includes circuit elements to frame on the incoming $F_T$ byte and its overhead, descramble the signal, remove the incoming $F_T$ byte, read and process its overhead, then reassemble the signal with the $F_T$ byte and its reprocessed overhead relocated to be in synchronism with all the other $F_T$ bytes and overhead being processed by all other preprocessors at that multiplexer. The reassembled signal is then rescrambled using the relocated $F_T$ byte as a sync signal to initiate the reading of a pseudo random word or sequence that is stored in memory. The pseudo random word is modulo 2 multiplied by the digital stream by means of an Exclusive-Or gate to which both signals are applied. The scrambled signal will have good statistics; for example, it will be reasonably well dc balanced and will be free of long transition-free intervals. Such scrambled signals can then utilize repeaters with ac coupling and statistical timing. By scrambling the signals before interleaving, high-speed line scrambling is avoided. The pseudo random words chosen for this tributary scrambling are selected to achieve the desired level of scrambling on the multiplexed high-speed line.

Figure 5:
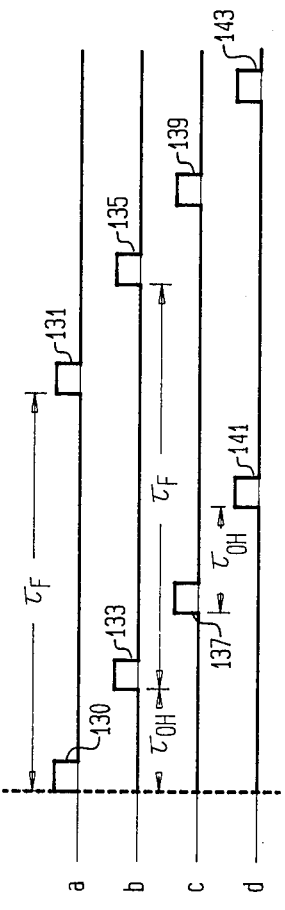
FIG. 5 are waveforms relating to the circuit of FIG. 4.

The block diagram of FIG. 4 illustrates one way in which the sliding of the auxiliary framing byte and its associated overhead can be implemented at each preprocessor in the system. The incoming sliding framing byte is denoted as $F_{TI}$ and the relocated outgoing byte as $F_{TO}$. Each preprocessor frames in on $F_{TI}$ and derives therefrom an $F_{TI}$ sync pulse train, each pulse thereof having a duration equal to the $F_{TI}$ byte length and synchronized therewith. The pulses 130 and 131 on line a of FIG. 5 are such $F_{TI}$ sync pulses. These $F_{TI}$ sync pulses are used to frame or synchronize a descrambler to which the scrambled signal is fed. The unscrambled signal is then applied to a short shift register of no more than two or three bytes in length and also to one input of an AND gate, the other input of which is a delayed version of the $F_{TI}$ sync signal. This delay is equal to $\tau_{OH}$, the time difference between the $F_{TI}$ bytes and its associated overhead, so that the AND gate passes the overhead to its output, and thence to an overhead processing circuit. A first three input AND gate is arranged to inhibit the writing of the tributary signal into the shift register during $F_{TI}$ pulses and during its associated overhead, by connecting the two inverting inputs of the AND gate to the aforementioned $F_{TI}$ pulse train and to its delayed version. The tributary signal is read out of the shift register except during the period when it is desired to insert the new $F_{TO}$ byte and its associated overhead, again by means of a three input AND gate with two inverting inputs. An OR gate at the output of the shift register combines the shift register output with the new $F_{TO}$ bytes and associated reprocessed overhead. The signal is then rescrambled before application to the bit interleaver, together with all of the other reprocessed tributary signals.

In FIG. 4 the incoming tributary signal on line 69 is applied to framing circuit 67 which frames on $F_{TI}$. Such framing circuits are well known in the art. In a synchronous system, a framing circuit produces a signal having a period equal to the frame length by dividing the system clock by the number of bits per frame. The framing process simply involves phasing this locally generated signal with the incoming framing bytes by means of a phase comparison circuit. Such a framing circuit is shown in U.S. Pat. No. 4,390,986, issued to Donald W. Moses on June 28, 1983. The circuit 67 produces the aforementioned framing sync pulses on lead 71. These pulses are shown at line a in FIG. 5. The pulses 130 and 131 thereof are coincident with the $F_{TI}$ bytes of the incoming signal. The incoming signal is also applied to PRW (pseudo random word) descrambler 75 to which lead 71 is also applied for sync purposes. The incoming $F_{TI}$ sync pulses on lead 71 synchronize the descrambler so that the PRW is coordinated in time with the incoming scrambled tributary signal. The PRW is stored in memory within the descrambler 75 as well as within the scramblers. It should be noted that the sliding framing bytes are sent unscrambled or in the clear, so that the $F_T$ framing circuits can recognize them. All other bits, including the $F_S$ framing bytes and all overhead data, can be and are scrambled.

The incoming $F_{TI}$ sync pulse train is also applied to delay line 99 which has a delay of $\tau_{OH}$, and hence the output pulses therefrom on lead 100 will coincide with the $F_{TI}$ overhead bytes in the incoming signal. These delayed pulses on lead 100 are shown as pulses 133 and 135 on the line labeled b in FIG. 5. These delayed pulses are applied to one input of AND gate 101, the other input of which is the descrambled incoming signal on lead 80 which is connected to the output 79 of descrambler 75. Gate 101 has its output connected to overhead process circuit 105. Thus this gate applies the incoming overhead data to circuit 105, which can read and rewrite this data if necessary before it is reapplied to the signal.

The AND gate 113 has its output lead 81 connected to the write control input of two byte shift register 77 and one of its inputs to the system clock 108. The two inverting or inhibiting inputs of gate 113 are connected to the incoming $F_{TI}$ pulse train via lead 71 and to the delayed version thereof via lead 100. The serial input of shift register is the output of descrambler 75 via lead 79. Thus input clocking of the shift register will be inhibited for the duration of each of the incoming $F_{TI}$ sync pulses and also during its associated overhead.

The local framing clock 109 is common to all of the preprocessors of a given multiplexer and it produces an outgoing $F_{TO}$ pulse train on lead 111 that establishes a common synchronized framing pattern for each multiplexer. The outgoing $F_{TO}$ sync pulse train is shown on line c in FIG. 5. It can be seen that this pulse train is merely a duplicate of the incoming sync pulse train with different phasing. However, the phasing of the new sync pulse train relative to the incoming sync pulse train or to the randomly phased $F_S$ bytes of each signal is not important. The phasing of the new $F_{TO}$ bytes can be random and variable as long as all outgoing tributary signals at a given multiplexer have the same synchronized $F_{TO}$ bytes with the overhead associated therewith.

The serial reading of the shift register 77 to its output lead 85 is inhibited during the outgoing $F_{TO}$ sync pulses and associated overhead by means of AND gate 115 that functions like gate 113 except that its two inhibiting inputs are connected to the outgoing $F_{TO}$ sync pulse train and to its delayed version. The output of gate 115 is connected to the write control terminal of the register via lead 83. The outgoing $F_{TO}$ sync pulses on lead 111 are delayed in delay line 97 by $\tau_{OH}$ seconds to yield a delayed version thereof that coincides with the timing of the desired outgoing overhead information. The leads 111 and 117 with these pulse trains thereon are applied to the two inhibiting or inverting inputs of gate 115 (as shown) to inhibit the write function during these periods. The delayed outgoing $F_{TO}$ sync pulses are shown at line d in FIG. 5 as pulses 141 and 143.

The circuit 93 produces the new $F_{TO}$ bytes in response to the sync signals applied thereto over lead 111 and also gates the rewritten overhead data applied thereto from circuit 105 over lead 107 by means of the delayed or overhead sync pulses applied thereto over lead 117. The OR gate 87 combines the data bits plus the $F_S$ bytes received from the output of the shift register 77 over lead 85 and the new $F_{TO}$ bytes and associated overhead from circuit 93 via lead 95. The output of the OR gate is then applied to PRW scrambler circuit 89 where the newly reassembled tributary signal is scrambled with circuitry that can be identical with the descrambling circuitry, namely with an Exclusive-OR gate that functions as a modulo 2 adder. The scrambler 89 is synchronized with the outgoing $F_{TO}$ signal through its connection to lead 111. By arranging the scrambling to start at the end of the outgoing $F_{TO}$ pulses and to end at the beginning of the next one, all data except the $F_T$ bytes will be scrambled. The PRW's applied to each tributary need not be the same. If the tributary scrambling patterns are chosen correctly, the resulting high-speed output data stream can be made to have a scramble equivalent to that scrambling which would have been achieved by applying a single PRW scrambler directly to the output stream.

It should be noted that the overhead data associated with each preprocessor can provide information regarding such things as the identity and routing of all of the signals multiplexed on an high-level tributary signal. This overhead would normally identify the sequence of the multiplexed high-level tributary signals, as well as such things as the origin and destination of each. This information is preserved throughout the system for use in decoding and demultiplexing of highly complex signals at the receiving end or ends of the system.

It is apparent that preprocessors substantially different from the one illustrated in FIG. 4 could be designed to process the sliding $F_T$ bytes required in this system. For example, the incoming $F_{TI}$ byte phase of any one of the incoming tributary signals could be selected as the phase of all the outgoin $F_{TO}$ bytes. Thus, one of the preprocessors would have its $F_T$ bytes unchanged in phase and the $F_{TI}$ sync pulse derived from the framing circuit of this preprocessor would be fed to all other preprocessors at that multiplexer to serve as a local framing clock, analogous to circuit 109 of FIG. 4. All of the preprocessors would have overhead processing circuitry such as that shown in FIG. 4.

Figure 6:
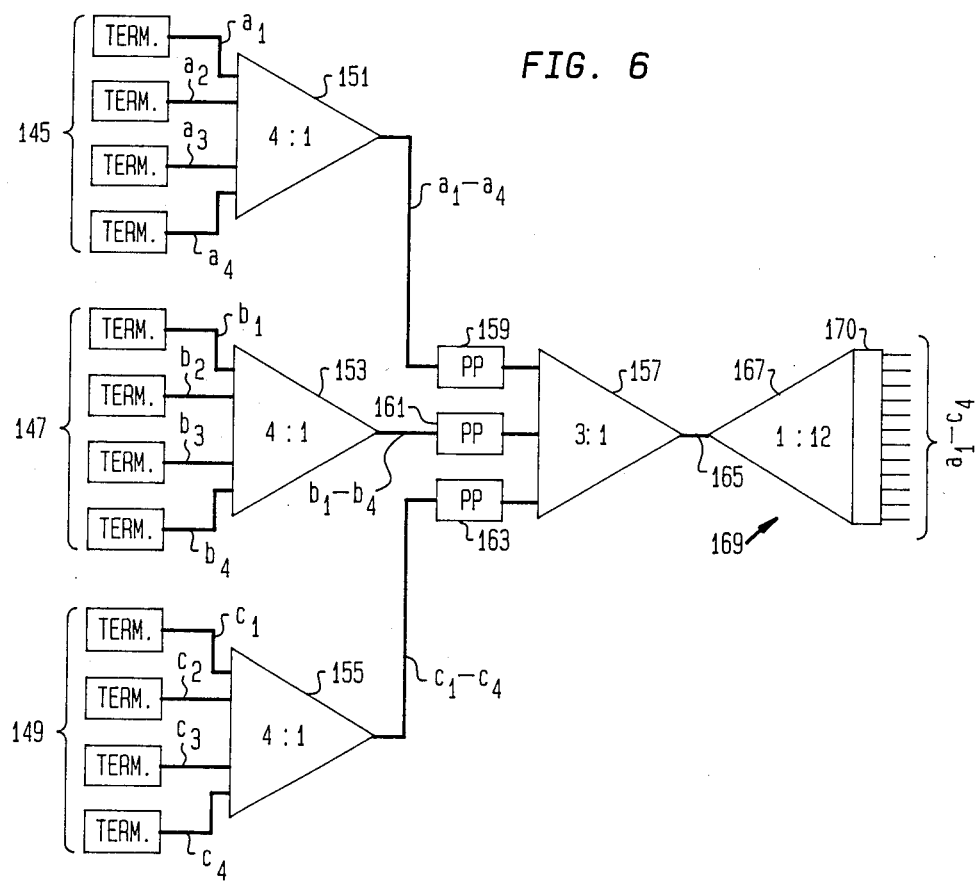
FIG. 6 is a diagram of a level 12 system according to the invention.

FIG. 6 shows a two level multiplexed system in which the outputs of three basic level multiplexers have their outputs applied to a single higher level multiplexer to yield a level 12 high-speed signal. This level 12 signal is then completely demultiplexed and decoded in a receiver comprising a single demultiplexer. The three basic level multiplexers are 151, 153 and 155, each having four basic subscriber lines connected thereto from the subscriber terminal groups 145, 147 and 149. The input tributary lines for each of the three basic level multiplexers are labeled $a_1$-$a_4$, $b_1$-$b_4$ and $c_1$-$c_4$. All of these three multiplexers (151, 153 and 155) would have preprocessor circuits like that of FIG. 4, but these have not been separately illustrated. The 3 to 1 multiplexer 157 with its associated preprocessors (159, 161 and 163) combines the three level 4 signals applied thereto to form a single level 12 signal on high-speed line 165. Assuming that the multiplexer 157 scans the incoming tributary signals in alphabetical order, the sequence of bits on the high-speed line will be $a_1b_1c_1a_2b_2c_2a_3b_3c_3a_4b_4c_4a_1b_1c_1$, etc. etc. Thus, the system architecture (or the block diagram) determines the sequence of the high-speed signals and this known sequence permits the decoding and demultiplexing of any high-speed signal by means of a single demultiplexer, even though the signals may have originated at numerous different terminals and passed through many multiplexers. It should be noted that the level 12 signal on line 165 will have three auxiliary framing bytes ($F_T$) thereon, each with different associated overhead. These three $F_T$ bytes and their different overheads each originated from a different one of the preprocessors of multiplexer 157. The overhead associated with preprocessor 159, for example, would include information concerning all of the four multiplexed signals $a_1$-$a_4$ from multiplexer 151. Likewise the other two preprocessors (161 and 163) will include overhead information regarding the signals $b_1$-$b_4$ and $c_1$-$c_4$, respectively.

The single receiver demultiplexer 169 includes a 1 to 12 bit de-interleaver 167 and associated framing and decoding circuitry 170. This circuitry yields the 12 output lines $a_1$ through $c_4$, which will still have the framing bytes $F_S$ and associated overhead thereon and the phasing of the $F_S$ bytes on all of these lines will still be random. The individual subscriber terminals to which these signals are applied can easily frame on the $F_S$ bytes and decode the digital data in the signals.

Figure 7:
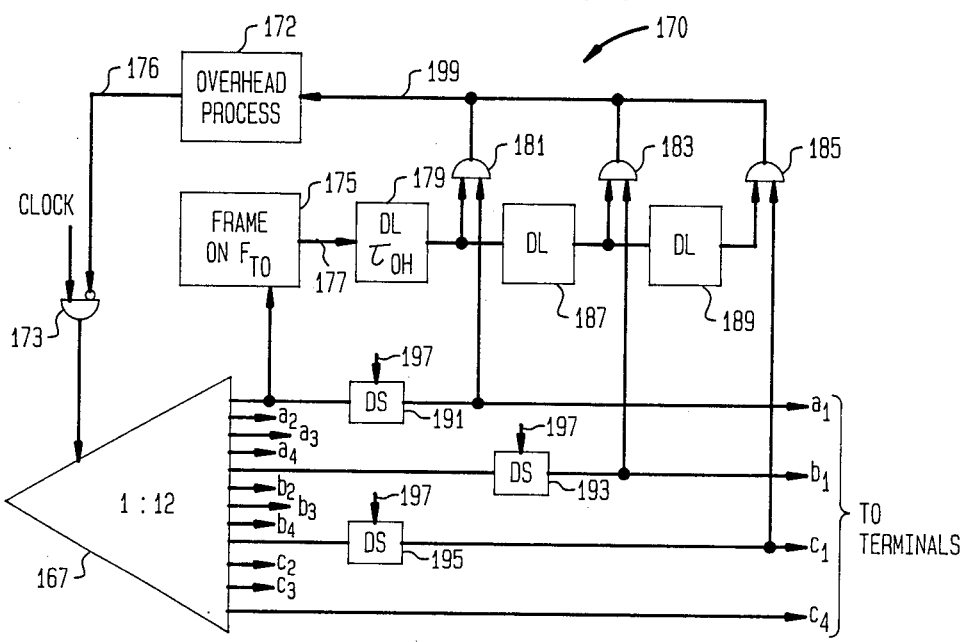
FIG. 7 is a block diagram of the receiving demultiplexer of FIG. 6, illustrating the mode of operation thereof.

FIG. 7 is a block diagram of the demultiplexer 169 of FIG. 6, showing more detail and illustrating the mode of operation thereof. The demultiplexer 169 comprises a 1 to 12 bit de-interleaver 167 that may comprise, for example, a 12 stage shift register into which the high-speed stream from line 165 is serially clocked at 12 times the system clock rate and read out in parallel to the 12 output lines each time the register is full. In order that the 12 output lines all receive their own signals, the demultiplexer must be properly phased. This phasing or framing circuit comprises circuit 175, having its input connected to line $a_1$. This line, when the circuit is properly phased or framed, will have the signals originating from line a of multiplexer 151 thereon. The framing circuit 175 is arranged to frame on the FTO byte produced by preprocessor 159, which processed the $a_1$-$a_4$ signals. The circuit 175 initially frames on whichever of the three $F_{TO}$ signals is on demultiplexer output line $a_1$, and it automatically reads the overhead associated therewith to determine whether it has framed on the proper byte. If the overhead indicates the wrong byte, the circuit automatically hunts for the right one and stops hunting when the right one is reached. To this end, framing circuit 175 produces a framing sync pulse train on its output lead 177 that is coincident with the $F_{TO}$ byte appearing on line $a_1$. This pulse train is applied to delay line 179 which has a delay equal to $\tau_{OH}$, and the delayed output thereof is applied to one input of AND gate 181, the other input of which is the line $a_1$, after it has passed through the descrambler 191. The output of gate 181 is applied to overhead processing circuit 172 via lead 199. Thus, the overhead data from line $a_1$ is applied to circuit 172 which reads the data therein. If this overhead data indicates that the signal on line $a_1$ is the $a_1$ data from multiplexer 151, then demultiplexer framing has been achieved and all of the demultiplexer lines $a_1$ through $c_4$ will also be framed. If, however, the framing circuit 175 has by chance framed on an $F_{TO}$ produced by either of the preprocessors 161 or 163, all of the output lines would be out of frame and thus none would have the proper signals thereon. In this situation, the overhead processor circuit 172 would generate one or more pulses that serve to remove one or more of the clock pulses that normally operate the aforementioned shift register that functions as a bit deinterleaver. The removal of these clock pulses will rotate or shift the phase of the output of the bit deinterleaver 167. For each deleted clock pulse the signals on all output lines will shift to the adjacent line. Thus, the signal on line $a_1$ might shift to $a_2$ or to $c_4$ and $a_2$ to $a_3$ or to $a_1$, etc. The circuit 172 can be provided with circuitry to determine the number of pulses required to achieve framing, given the line identification information in the overhead data. These pulses are applied to the inhibit input of AND gate 173 via lead 176. The other input of this gate is the system clock. The output of gate 173 is applied to the bit de-interleaver to operate the shift register thereof, as explained above.

The delayed frame sync pulses at the output of delay line 179 are further delayed in delay lines 187 and 189, so that the overhead associated with the other two $F_{TO}$ framing bytes produced by preprocessors 161 and 163 can be obtained and processed by circuit 172. To this end the output of delay line 187 is applied to AND gate 183 together with the signal from line $b_1$, and the still further delayed sync pulses at the output of delay line 189 are applied to one input of AND gate 185, the other input of which is the line $c_1$. The outputs of these two AND gates are applied to overhead processor 172 via line 199 for the purpose of reading of the aforementioned overhead bytes.

All of the output lines $a_1$–$c_4$ would be provided with descramblers such as those labeled 191, 193, and 195. All of these would be provided with properly phased sync signals 197 for synchronizing the pseudo random words stored in memory in each descrambler with the incoming digital signals. A single descrambler could be inserted in the high-speed line to simultaneously descramble all the multiplexed signals by the use of a longer pseudo random word which is a composite of all the PRW's used at the last multiplexer in the system.

While the invention has been described in connection with preferred embodiments, obvious variations therein will occur to those skilled in the art. Accordingly, the invention should be limited only by the scope of the appended claims.

What is claimed is:

1. A multilevel, multiplexed digital transmission system in which all of the digital signals to be multiplexed comprise a conventional framing byte $F_S$ and an auxiliary framing byte, $F_T$ and associated overhead, said system comprising:
   a plurality of multiplexers of basic level and higher level, each with a plurality of tributary signals connected thereto, in which the said higher level multiplexers interleave the outputs of two or more multiplexers of lower level, or of basic level,
   all of said multiplexers comprising a plurality of preprocessors connected for processing each of said tributary signals, the outputs of all of the preprocessors at a multiplexer connected to a bit interleaver,
   each of said preprocessors comprising means for shifting the said auxiliary framing bytes $F_T$ and associated overhead of said incoming tributary signals relative to the said $F_S$ bytes thereof so that all the tributary signals will have synchronized $F_T$ bytes and overhead at the inputs of said bit interleaver, and
   each of said preprocessors further comprising means to read and process said overhead associated with said $F_T$ bytes.

2. The system of claim 1, wherein said preprocessors have descramblers at their inputs and scramblers at their outputs to rescramble the outgoing tributary signals prior to application to said bit interleaver.

3. The system of claim 2 wherein said scramblers comprise means to modulo 2 multiply the said tributary signals by a pseudo random word, which word is different for each preprocessor at a given multiplexer, and wherein said different pseudo random words are chosen to achieve a desired scrambling of the high-speed signal at the output of said given multiplexer.

4. A multilevel, synchronous multiplexed digital transmission system in which all signals to be multiplexed are provided with an auxiliary framing byte $F_T$ and associated overhead, as well as a conventional framing byte $F_S$, which frames the data being transmitted
   said system comprising a plurality of basic level multiplexers and a plurality of higher level multiplexers which multiplex the outputs of groups of said basic level multiplexers,
   all of the multiplexers of said system comprising preprocesors for separately processing all imcoming tributary signals,
   said preprocessors comprising means to bring the said $F_T$ bytes and overhead of each tributary signal into local multiplexer phase alignment, whereby the $F_T$ bytes and overhead of all tributary signals will be synchronized at the outputs of all preprocessors at each multiplexer, each of said preprocessors further comprising means to read, process and rewrite said overhead data and wherein said $F_S$ bytes and the data framed thereby are unaffected by said preprocessors.

5. The system of claim 4 wherein said means to bring said $F_T$ bytes into local multiplexer phase alignment comprises:
   a shift register of the order of two bytes length, into which the incoming tributary signal is serially written,
   means to inhibit the said writing during the duration of the $F_T$ byte and associated overhead of the incoming tributary signal,
   and means to serially read out said shift register except during the time when it is desired to insert the relocated or outgoing $F_T$ byte and its associated overhead.

6. A preprocessor circuit for use in multiplexer systems utilizing pulse displacement synchronization, said preprocessor circuit having a tributary signal applied thereto and comprising:
   means to frame on a slidable $F_T$ framing byte in an incoming tributary signal to be multiplexed and means to generate an incoming $F_T$ sync pulse train synchronized therewith, means to generate a delayed incoming $F_T$ sync pulse train, a descrambler connected to said incoming tributary signal, an AND gate having inputs connected to the output of said descrambler and to said delayed incoming sync pulse train, the output of said AND gate comprising the incoming overhead data, a shift register, means to serially apply the output of said descrambler to the input of said register except during the periods of said incoming $F_T$ byte and its overhead, means common to all preprocessors at a given multiplexer to generate an outgoing $F_T$ sync pulse train and a delayed version thereof which is coincident with the related overhead, means to inhibit the writing of said shift register to its output during the periods of the desired outgoing $F_T$ byte and overhead in the outgoing tributary signal, means to process and rewrite said incoming overhead data, and means connected to the output of said shift register to insert an outgoing $F_T$ byte in said outgoing tributary signal in synchronism with said outgoing $F_T$ sync pulse train and means to insert said reprocessed overhead data into said outgoing tributary signal in synchronism with said delayed outgoing $F_T$ sync pulse train.

7. A preprocessor circuit in accordance with claim 6 further comprising means to scramble the said outgoing tributary signal.

8. A preprocessor circuit for use in preocesing tributary digital signals at each multiplexer of a multilevel, synchronous, digital transmission system comprising a plurality of basic level multiplexers and a plurality of higher level multiplexers which multiplex the outputs of groups of said basic level multiplexers, and which utilizes a sliding auxiliary framing byte $F_T$ for multiplexer framing purposes, as well as a conventional framining byte for framing the data being transmitted, said preprocessor comprising:

means to frame on said incoming $F_T$ bytes and its overhead in incoming tributary signals, means to read and reprocess said overhead data, means to remove said incoming $F_T$ byte and its overhead from said tributary signal, and means to insert outgoing $F_T$ bytes and reprocessed overhead into said tributary signals in accordance with a local $F_T$ framing signal which is common to all preprocessors at a given multiplexer.

9. In a multilevel, multiplexed digital transmission system comprising a plurality of basic level multiplexers and a plurality of higher level multiplexers which multiplex the outputs of groups of said basic level multiplexers, a preprocessor in a multiplexer responsive to conventional and auxiliary framing bytes and comprising means for detecting said auxiliary framing bytes and means for shifting said auxiliary framing bytes with other multiplexers.

10. A multilevel, multiplexed digital transmission system comprising a plurality of basic level multiplexers and a plurality of higher level multiplexers which multiplex the outputs of groups of said basic level multiplexers, in which the digital signals are provided with an auxiliary sliding framing byte, $F_T$, and associated overhead, as well as a conventional framing byte $F_S$ which frames the data, each of the multiplexers of said system having a plurality of tributary signals applied thereto, with a separate preprocessor for processing each of said tributary signals, each said preprocessor comprising, means to bring all of the said $F_T$ bytes and associated overhead of all of said tributary signals at a given multiplexer into common local frame alignment, and means to read and reprocess said overhead data.

11. A method of multiplexer frame synchronization for synchronous, multilevel, multiplexed, digital transmission systems, in which a plurality of basic level multiplexers have their outputs multiplexed by higher level multiplexers, comprising the steps of:

providing all of the digital signals in said system with an auxiliary framing byte, $F_T$, and associated overhead data, in addition to a conventional framing byte $F_S$ which frames the data, bring all of said $F_T$ bytes and associated overhead data into common local frame alignment at each multiplexer in said system, by sliding said $F_T$ bytes relative to said $F_S$ bytes, and relative to said $F_S$ bytes, and reading and reprocessing the said overhead data at each multiplexer in said system.

12. A multilevel, multiplexed, digital transmission system in which a plurality of basic level multiplexers have their outputs multiplexed by higher level multiplexers in which all of the digital signals therein are provided with a slidable auxiliary framing byte, $F_T$, and associated overhead, as well as a conventional framing byte $F_S$, each said multiplexer including means for locally synchronizing all of said $F_T$ bytes and associated overhead, while allowing the bytes $F_S$ and the data framed thereby to retain its original random alignment.

* * * * *

UNITED STATES PATENT AND TRADEMARK OFFICE
CERTIFICATE OF CORRECTION

PATENT NO. : 4,719,624

DATED : January 12, 1988

INVENTOR(S) : Jules A. Bellisio

It is certified that error appears in the above-identified patent and that said Letters Patent is hereby corrected as shown below:

Column 5, line 7, after "$F_T$", insert the word --has--.

Column 6, line 43, after "$F_{TI}$", insert the word --sync--.

Column 6, line 51, after "$F_{TO}$", insert the word --sync--.

Column 7, line 40, "an" should read --any--.

Column 7, line 52, "outgoin" should read --outgoing--.

Column 8, line 12, "etc. etc." should read --etc.--

Column 8, line 52, "a" should read --$a_1$--.

Column 8, line 53, "FTO" should read --$F_{TO}$--.

Column 11, line 36, "proecesing" should read --processing--.

Column 11, line 43, "framining" should read --framing--.

Column 12, line 8, after "bytes", insert --in time to synchronize said auxiliary framing bytes--.

Column 12, line 37, "bring" should read --bringing--.

Signed and Sealed this

Twelfth Day of July, 1988

Attest:

DONALD J. QUIGG

Attesting Officer

Commissioner of Patents and Trademarks